(12) United States Patent
Laming et al.

(10) Patent No.: US 6,345,134 B1
(45) Date of Patent: Feb. 5, 2002

(54) OPTICAL DEVICE FOR COMPENSATING THE DISPERSION OF OPTICAL SIGNALS

(75) Inventors: Richard Ian Laming, Southampton; Wei-Hung Loh; Michael Nickolaos Zervas, both of Hampshire, all of (GB); Sergio Barcelos, Campinas (BR)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/101,732

(22) PCT Filed: Jan. 15, 1997

(86) PCT No.: PCT/GB97/00113

§ 371 Date: Mar. 1, 1999

§ 102(e) Date: Mar. 1, 1999

(87) PCT Pub. No.: WO97/26581

PCT Pub. Date: Jul. 24, 1997

(30) Foreign Application Priority Data

Jan. 17, 1996 (GB) .............................. 9600947

(51) Int. Cl.[7] .............................................. G02B 6/34
(52) U.S. Cl. ...................................................... 385/37
(58) Field of Search ........................... 385/30–37, 147, 385/137, 139, 140

(56) References Cited

U.S. PATENT DOCUMENTS

| 4,703,287 A | * | 10/1987 | Fournier, Jr. et al. ...... 332/7.51 |
| 5,694,501 A | * | 12/1997 | Alavie et al. .................. 385/37 |
| 5,991,483 A | * | 11/1999 | Engelberth .................... 385/37 |
| 6,111,999 A | * | 8/2000 | Espindola et al. ............. 385/37 |
| 6,192,177 B1 | * | 2/2001 | Amundson et al. ........... 385/37 |

FOREIGN PATENT DOCUMENTS

| GB | 2 276 466 | 9/1994 |
| WO | WO 95/12136 | 5/1995 |

OTHER PUBLICATIONS

K.O. Hill et al., "Variable–Spectral–Response Optical Waveguide Bragg Grating Filters for Optical Signal Processing", Optic Letters, vol. 20, No. 12, pp. 1438–1440, Jun. 15, 1995.

* cited by examiner

Primary Examiner—Akm E. Ullah
(74) Attorney, Agent, or Firm—Finnegan, Henderson, Farabow, Garrett & Dunner, L.L.P.

(57) ABSTRACT

An optical device comprises an optical fibre device having wavelength-dependent optical characteristics mounted on a bimorph element operable to bend in response to an electrical control signal, so that the wavelength-dependent optical characteristics of the optical fibre device vary in response to bending of the bimorph element.

18 Claims, 4 Drawing Sheets

OPTICAL DEVICE FOR COMPENSATING THE DISPERSION OF OPTICAL SIGNALS

Figure 1:
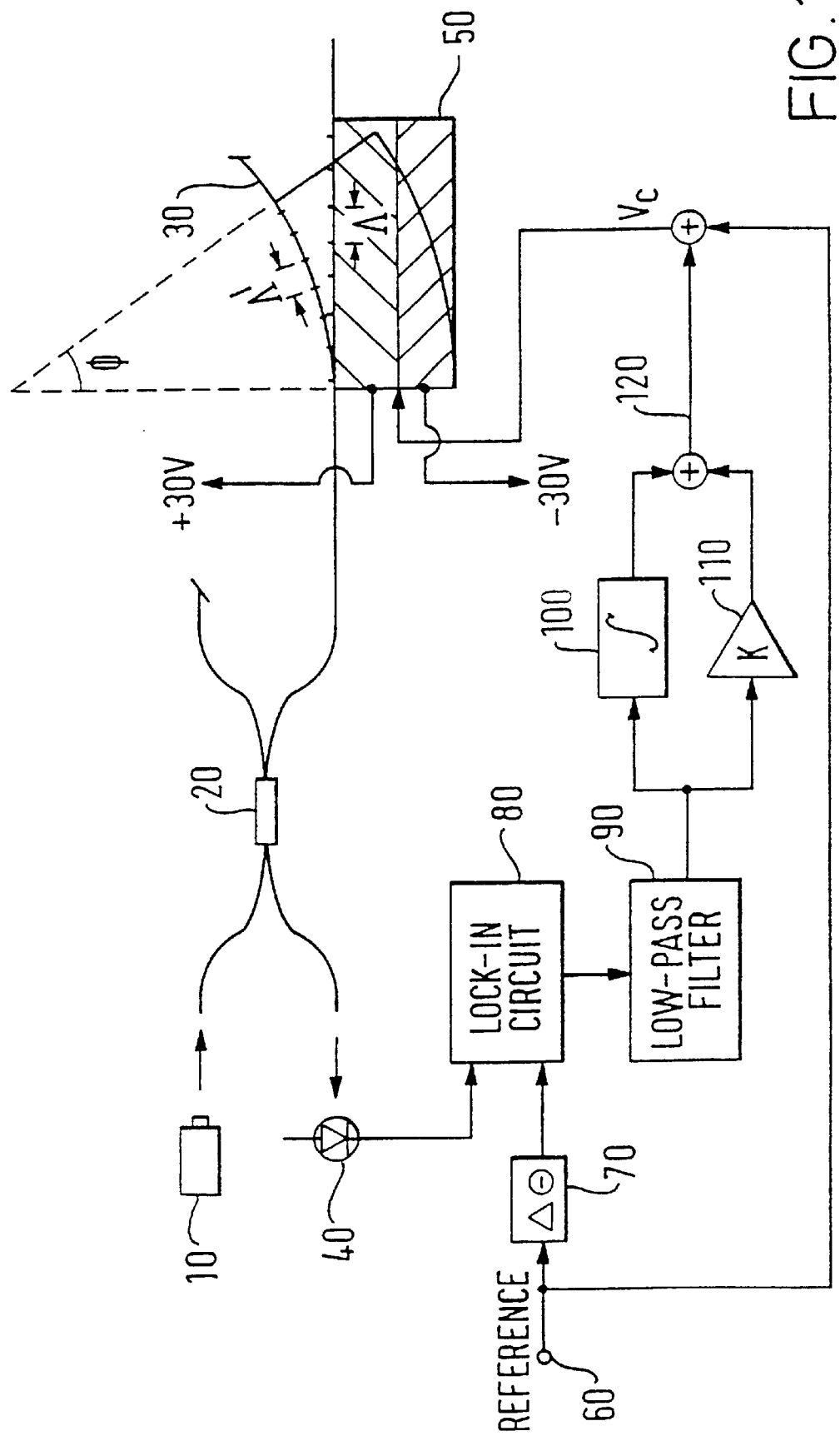

This invention relates to optical devices.

Wavelength-selective optical fibre devices such as optical fibre gratings are commonly used in optical communication links. An example of this is the use of chirped optical fibre gratings connected to an optical fibre link to provide compensation against the dispersion of the optical fibre link.

Chirped fibre gratings are particularly useful in this type of application, as they are compact, passive and relatively simple to fabricate. It has been proposed that the dispersion compensation given by this technique will allow currently installed step-index optical fibre links to be upgraded to higher bit rates at, for example a wavelength of 1.5 $\mu$m (micrometers).

Chirped optical fibre gratings are inherently narrow-band devices, with a dispersion-bandwidth product proportional to the grating's length. Two conflicting requirements then arise. Firstly, the dispersion of the grating must be sufficient to compensate for that of the fibre link, which in turn is generally proportional to the length of the fibre link. Secondly, however, the bandwidth of the grating must be sufficient no only for the optical bandwidth of the signal being transmitted via the fibre link, but also to allow for inaccurate specification or temporal drift of the optical transmitter's centre wavelength.

The conflicting effect of these two requirements means that a grating 1 metre long would be required to provide a 5 nm (nonometre) bandwidth and a dispersion sufficient to compensate a 100 km (kilometre) link of currently standard telecommunications fibre. However, current technology does not provide a convenient technique for fabricating such a long grating, and gratings of about one tenth of this length are at the limit of present fabrication techniques.

It has been proposed that these problems can be avoided, if the grating is made to track the transmitter's centre wavelength. This would allow a narrower bandwidth grating to be used, so increasing the dispersion available for a particular grating length. (The inverse of this proposal, where the transmitter is locked on to the grating, is undesirable in multiple-grating systems).

Previously proposed techniques for varying the wavelength response of a fibre grating include stretching and compressing the grating using a linear piezoelectric transducer (PZT), or mounting the grating on a cantilever member which is then bent by a linear PZT attached to the free end of the cantilever member. However, in the linear PZT technique the grating is prone to buckling, and in the cantilever technique the grating will tend to become chirped (or an existing chirp of the grating will undesirably vary) as the cantilever bends.

U.S. Pat. No. 4,703,287 discloses a phase modulator formed by mounting an optical fibre on a bimorph element.

This invention provides an optical device comprising an optical fibre grating having wavelength-dependent optical characteristics mounted on a bimorph element operable to bend in response to an electrical control signal, so that the wavelength-dependency of the optical characteristics of the optical fibre grating vary in response to bending of the bimorph element.

By using a bimorph element in this way, a uniform compression or stretch (not easily obtainable with the cantilever technique) can be applied to the optical fibre grating, thus varying its wavelength-dependent properties but without necessarily changing the grating's chirp. The fibre can be securely fastened (e.g. glued) to the bimorph element along its length, avoiding the problems of fibre buckling.

Preferably the optical fibre grating is a chirped optical fibre grating. Preferably the grating is apodised so that the modulation of refractive index of the fibre has a substantially cosine-shaped envelope.

In order to increase the amount of compression or stretching applied to the fibre device, it is preferred that the bimorph element comprises more than two active layers of piezoelectric material. It is also preferred that the bimorph element comprises a plurality of active layers of piezoelectric material and an inert buffer layer disposed on the active layers, the optical fibre grating being attached to the buffer layer.

In order that the wavelength-dependent characteristics of the device can be made to track those of, say, an optical transmitter, it is preferred that the device comprises a feedback control circuit for detecting whether the wavelength-dependent characteristics of the optical fibre grating match those of a received optical signal, and, if not, for adjusting the electrical control signal so that the wavelength-dependent characteristics of the optical fibre grating more closely match those of the received optical signal.

In order to detect wavelength tracking errors and to determine an appropriate direction for applying a corrective signal, it is preferred that the device comprises means for applying a dither signal to the electrical control signal, and/or the means for detecting comprises a wavelength-scanning optical monitor.

The invention also provides optical communication apparatus comprising: an optical transmitter; a dispersive optical fibre link; and an optical device as defined above, the device having a dispersion characteristic acting against the dispersion of the optical fibre link.

Preferably the communication apparatus comprises an optical receiver for receiving optical signals transmitted via the optical fibre link;

and the means for detecting comprises means for deriving an electrical signal indicative of the magnitude of the output of the optical receiver.

Figure 2:
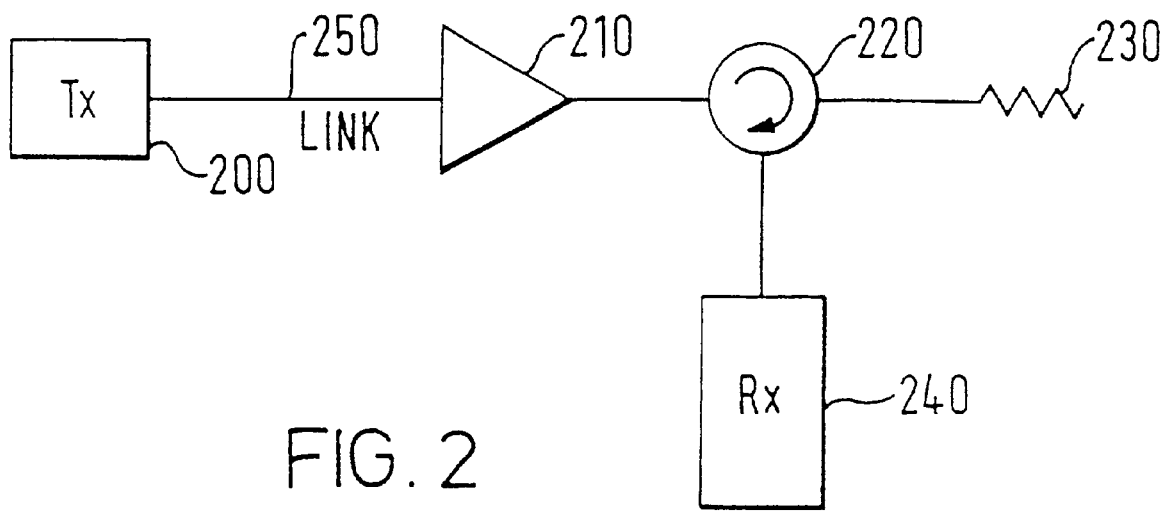
Figure 3:
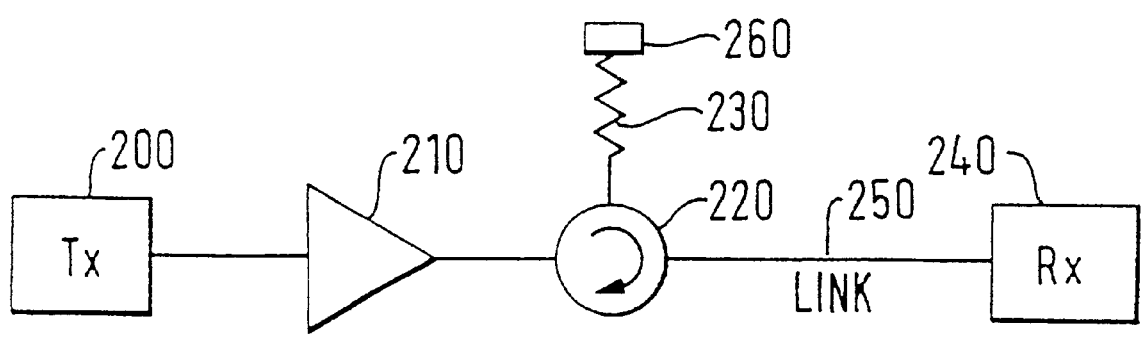
Figures 4, 5:
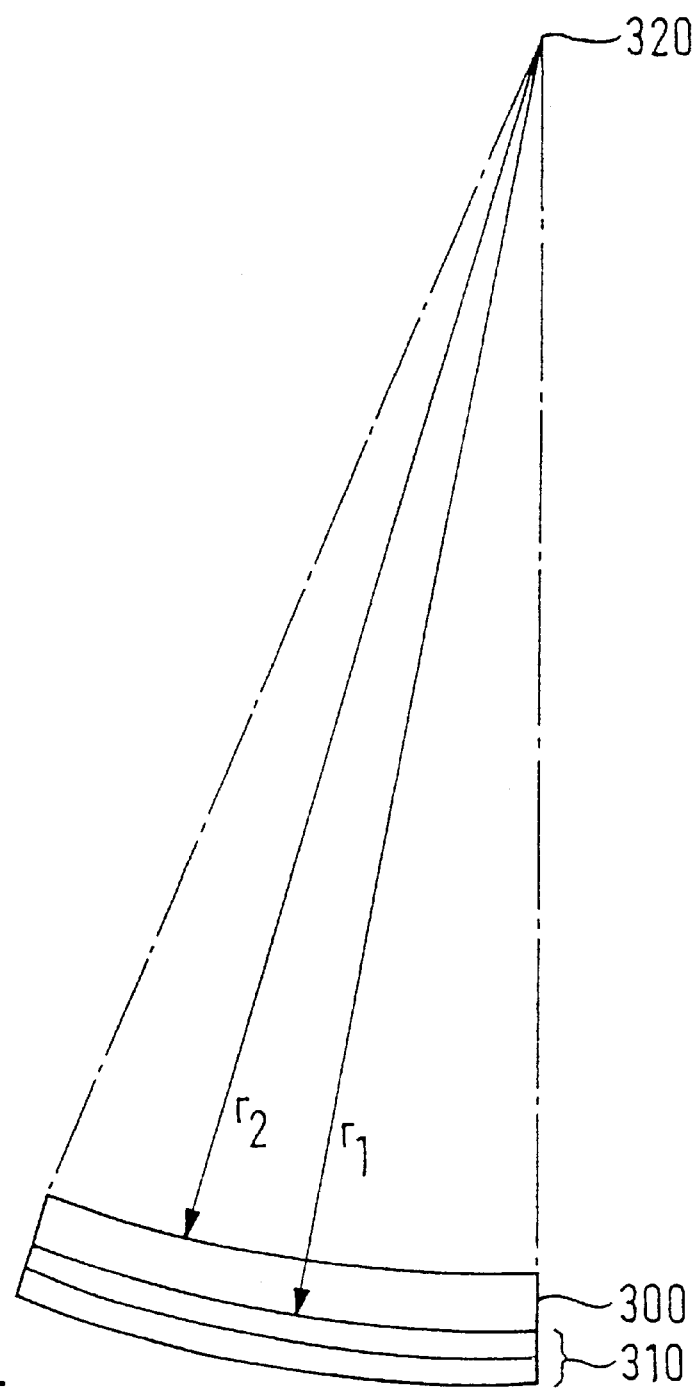
Figure 6:
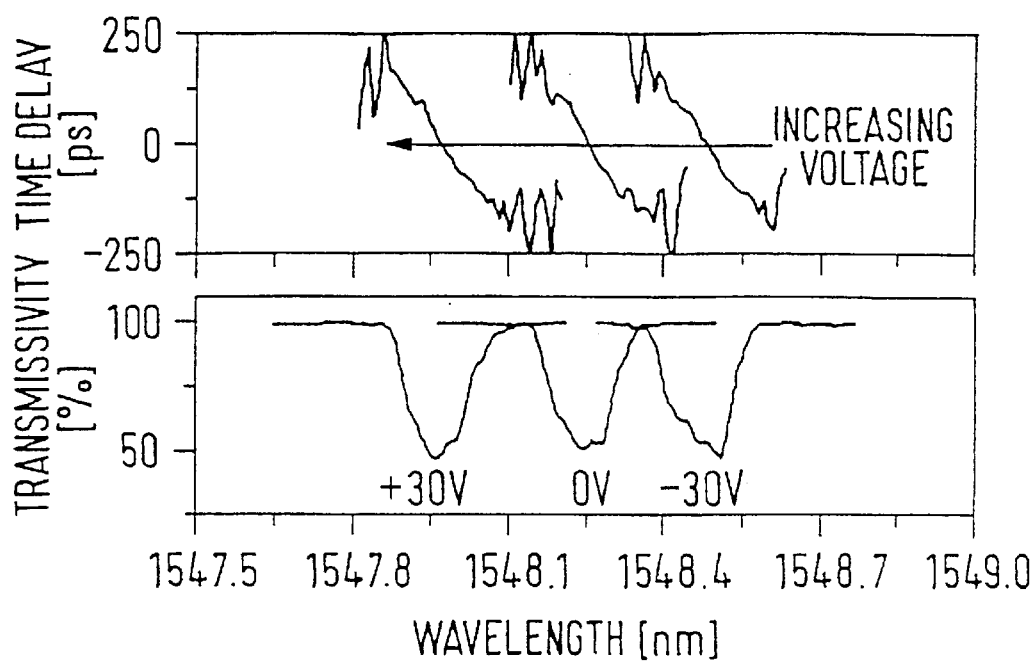
Figure 7:
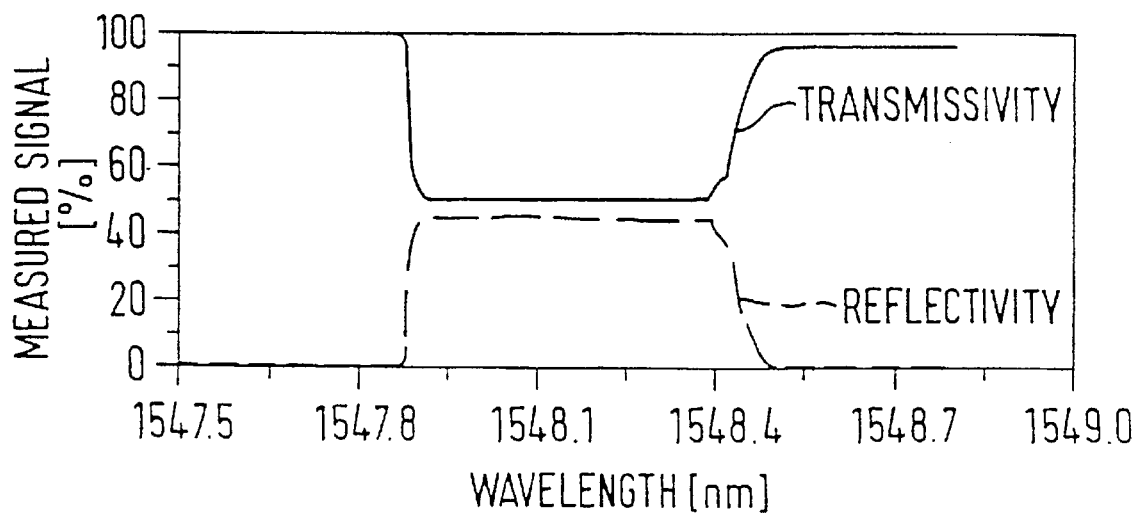

The invention will now be described by way of example with reference to the accompanying drawings, throughout which like parts are referred to by like references, and in which:

FIG. 1 is a schematic diagram of a test apparatus incorporating a grating according to an embodiment of the invention;

FIGS. 2 and 3 schematically illustrate optical communication links using such gratings;

FIG. 4 schematically illustrates a bimorph element;

FIG. 5 schematically illustrates the bimorph element of FIG. 3 when bent in response to an electrical control signal;

FIG. 6 schematically illustrates the grating characteristics in open loop operation for three voltages of the electrical control signal; and FIG. 7 schematically illustrates the grating characteristics in closed loop operation.

FIG. 1 is a schematic diagram of a test apparatus incorporating a grating according to an embodiment of the invention.

In the test apparatus, a tunable laser source 10 supplies an optical signal via a coupler 20 to a grating 30. Light reflected from the grating 30 returns via the coupler 20 to an optical receiver 40.

The grating 30 is mounted on a bimorph element 50. The bimorph element comprises a plurality of active piezo electric (PZT) layers and is operable to bend in response to an electrical control signal Vc. When the bimorph element 50 bends, the fibre grating 30 is also bent and compressed/stretched and so the centre wavelength of the fibre grating is adjusted.

The fibre grating 30 in this embodiment is a 40 mm (millimetre) chirped fibre grating constructed using a moving fibre/phase mask-scanning beam technique with a cosinusoidal apodisation profile. This fabrication technique is described in the article "Moving Fibre/Phase Mask—Scanning Beam Technique for Enhanced Flexibility in Producing Fibre Gratings with a Uniform Phase Mask", Electronics Letters, Volume 31, no. 17, August 1995.

At room temperature, the properties of the grating (when not bent) are as follows:

| 3 dB bandwidth | 0.135 nm |
|---|---|
| Peak reflectivity | 46% |
| Dispersion | −1695 ps/nm |

This dispersion is broadly equivalent to the dispersion of 100 km of standard telecom fibre and the bandwidth is appropriate for a 10 Gbit/s transmission system.

The grating is mounted on one side of the bimorph element 50. For clarity, the grating is illustrated flat against the bimorph element 50 in FIG. 1, and also in a curved or bent position resulting from a bend of the bimorph element 50. Because of the way the grating is mounted on the bimorph element, applying the control voltage Vc to the bimorph element causes the grating to expand or compress uniformly, which tunes the central wavelength but leaves the chirp constant.

In the apparatus of FIG. 1, an electrical feedback control circuit is used to allow the grating to actively track the transmitter wavelength (in FIG. 1, for test purposes, the transmitter wavelength is deliberately changed using the tunable laser 10; in a real application, the transmitter wavelength could deviate with time, temperature or a change of transmitter device).

In the feedback control circuit, an electrical reference signal 60 is supplied via an ac (alternating current) modulator 70 to a lock-in circuit 80. The lock-in circuit 80 also receives the output envelope of the optical receiver 40 and generates an error signal indicating the difference between the reference signal and the output of the receiver 40. This error signal is low-pass filtered by a filter 90 and is then supplied to an integrator 100 and a scaling amplifier 110, the outputs of which are added to generate a filter and scaled error signal 120. This error signal 120 is then added to the original reference signal 60 to generate the control signal Vc for the bimorph element.

The purpose of the ac modulator 70 is to add a small ac component to the reference signal 60 to provide a dither of the degree of bend of the bimorph element 50. The dither is used to detect whether an improved response can be obtained by changing the degree of bend of the bimorph element in either direction. In the present embodiment, the bimorph element has a frequency response of up to about 500 Hertz, so active locking is achievable at frequencies up to approximately this limit (which is generally much higher than the high frequency limit for the other techniques discussed in the introduction).

FIGS. 2 and 3 schematically illustrate optical communication links using a bimorph-mounted grating and control circuit of the type shown in FIG. 1.

In FIGS. 2 and 3, an optical transmitter 200 generates optical signals which are eventually received by an optical receiver 240, having been amplified by an amplifier 210. In the arrangement of FIG. 2, the transmitter 200 supplies the signals directly to an optical fibre link (e.g. many kilometres long) 250, the output of which is then amplified and supplied to an optical circulator 220. At one port of the optical circulator 220 is a grating 230 of the type described above, with associated control circuitry, and at the other port of the optical circulator is the receiver 240. FIG. 3 has a similar arrangement except that the grating 230 and optical circulator 220 are positioned before the optical fibre link 250.

In each of the arrangements of FIG. 2 and 3, the bimorph-mounted grating 230 is used to compensate for the dispersion of the optical fibre link 250, while tracking the centre frequency of the optical transmitter 200. In FIG. 2, the equivalent to the signal supplied by the optical receiver 40 in FIG. 1 can actually be supplied by the optical receiver 240, so that the optical receiver 240 itself also supplies an envelope signal to the control circuitry for the bimorph element. In other respects, the control circuitry may be the same as that shown in FIG. 1. As an alternative, in FIG. 3, light which is not reflected by the grating 230 can be monitored at the end of the grating 230 not connected to the optical circulator 220 by a receiver 260. Again, this can generate the envelope signal to be supplied to the lock-in circuit 80, although in this case the signal will have the opposite to that generated by the receiver 40 (i.e. it will be at it lowest if the grating is perfectly locked to the transmitter wavelength).

In a further alternative arrangement of FIG. 3, the detector 260 might be a scanning optical detector such as a scanning Fabry-Perot device. The use of such a device can avoid the need for the dither signal supplied by the ac modulator 70, as the scanning detector can detect whether the grating would be better aligned to the transmitter centre wavelength for a small movement of the bimorph element in either direction.

FIGS. 4 and 5 schematically illustrate the bimorph element 50 when not bent (FIG. 4) and when bent in response to the control signal Vc (FIG. 5).

It is desirable to obtain a small radius of curvature of the optical fibre grating 30, to give a correspondingly large variation in the centre wavelength of the grating response. In one embodiment, this can be achieved by using a multi-layer bimorph element (i.e. greater than two layers). However, in the present arrangement to be described, the radius of curvature applied to the fibre grating 30 is reduced by adding an inert buffer layer 300 in addition to the two or more active (Piezo Electric) layers 310 of the bimorph element. In effect, the buffer layer 300 multiplies the compression or extension of the optical fibre gating 30 from that which would be obtained simply be attaching the grating 30 directly to the uppermost active layer 310.

This principle is illustrated in FIG. 5, where the bimorph element is shown curved around a centre of curvature 320. It can be seen that the radius of curvature r2 of the surface of the inert buffer layer is smaller than the radius of the curvature r1 of the uppermost active layer 310.

In the particular example used in a prototype apparatus, the active layers 310 were formed of a multi-layer low voltage bimorph element such as an element sold by Physik Instrument GmbH under the part no. PB140.10. The element is 45 mm long and 0.8 mm thick. By applying the control voltage (Vc) at up to ±30 volts induces a constant curvature along the device. Measured at one end of the device, the curvature results in a maximum deflection of ±0.5 mm.

Without the buffer layer, a maximum tuning range of 0.51 nm was obtained. By adding the buffer layer 300, a tuning range of between 1.7 nm and 5 nm has been obtained. The figure of 1.7 nm was obtained using a PVC buffer layer 1 mm thick.

FIG. 6 illustrates the time delay and transmissivity against wavelength for the grating 30 with three test voltages applied to the bimorph element 50 in an open loop configuration. The three test voltages were +30 volts, 0 volts and −30 volts. It can be seen from FIG. 6 that the different voltage tunes the central wavelength of the chirped grating but leaves the chirp relatively constant.

FIG. 7 illustrates the response of the grating and control circuitry in a close loop configuration. This shows that the grating characteristics can be maintained relatively constant over a tuning range of, in this example, about 0.51 nm. (FIG. 7 was obtained in a prototype apparatus not using the buffer layer 300).

What is claimed is:

1. An optical device comprising
   a bimorph element operable to bend in response to an electric control signal; and
   an optical fibre grating having wavelength-dependent optical characteristics, mounted on the bimorph element so that the bending of the bimorph element causes the grating to expand or compress and the wavelength-dependency of the optical characteristics to vary.

2. A device according to claim 1, in which the optical fibre grating is a chirped optical fibre grating.

3. A device according to claim 1, wherein the grating is apodised so that the modulation of refractive index of the fibre has a substantially cosine-shaped envelope.

4. A device according to claim 1, wherein the bimorph element comprises more than two active layers of piezoelectric material.

5. A device according to claim 1, wherein the bimorph element comprises a plurality of active layers of piezoelectric material and an inert buffer layer disposed on the active layers, the optical fibre grating being attached to the buffer layer.

6. A device according to claim 1, further comprising a feedback control circuit detector for detecting whether the wavelength-dependent characteristics of the optical fibre grating match those of a received optical signal, and, if not, for adjusting the electrical control signal so that the wavelength-dependent characteristics of the optical fibre grating more closely match those of the received optical signal.

7. A device according to claim 6, further comprising means for applying to the electrical control signal an ac dither signal smaller than the electrical control signal.

8. A device according to claim 6, in which the means for detecting comprises a wavelength-scanning optical monitor.

9. Optical communication apparatus comprising:
   an optical transmitter (200);
   a dispersive optical fibre link (250); and
   an optical device (230) according to any one of the preceding claims, the device having a dispersion characteristic acting against the dispersion of the optical fibre link.

10. Optical communication apparatus comprising:
    an optical transmitter for generating optical signals;
    a dispersive optical fibre link optically coupled to the optical transmitter, for transmitting the optical signals;
    an optical device according to claim 1, optically coupled to the optical fibre link for compensating the dispersion of the optical signals; and
    an optical receiver optically coupled to the optical fibre link, for receiving the optical signals.

11. A device according to claim 3, wherein the bimorph element comprises more than two active layers of piezoelectric material.

12. A device according to claim 3, wherein the bimorph element comprises a plurality of active layers of piezoelectric material and an inert buffer layer disposed on the active layers, the optical fibre grating being attached to the buffer layer.

13. A device according to claim 4, further comprising a feedback control circuit detector for detecting whether the wavelength-dependent characteristics of the optical fibre grating match those of a reference optical signal, and, if not, for adjusting the electrical control signal ($V_c$) so that the wavelength-dependent characteristics of the optical fibre grating more closely match those of the reference optical signal.

14. A device according to claim 13, further comprising means for applying to the electrical control signal an ac dither signal smaller than the electrical control signal.

15. A device according to claim 5, further comprising a feedback control circuit detector for detecting whether the wavelength-dependent characteristics of the optical fibre grating match those of a reference optical signal, and, if not, for adjusting the electrical control signal ($V_c$) so that the wavelength-dependent characteristics of the optical fibre grating more closely match those of the reference optical signal.

16. A device according to claim 15, further comprising means for applying to the electrical control signal an ac dither signal smaller than the electrical control signal.

17. An optical communication apparatus according to claim 10, wherein the optical device comprises a feedback control circuit coupling the optical receiver to the optical device, for adjusting the electrical control signal in accordance with the characteristics of the received optical signal.

18. An optical communication apparatus according to claim 17, wherein the feedback control circuit comprises means for applying to the electrical control signal an ac dither signal smaller than the electrical control signal.

* * * * *

UNITED STATES PATENT AND TRADEMARK OFFICE
CERTIFICATE OF CORRECTION

PATENT NO.    : 6,345,134 B1
DATED         : February 5, 2002
INVENTOR(S)   : Richard Ian Laming et al.

It is certified that error appears in the above-identified patent and that said Letters Patent is hereby corrected as shown below:

<u>Title page,</u>
Item [57], delete the ABSTRACT in its entirety and substitute therefor:
   -- An optical device comprises a bimorph element operable to bend in response to an electric control signal; an optical fibre grating having wavelength-dependent optical characteristics, mounted on the bimorph element so that the bending of the bimorph element causes the grating to expand or compress and the wavelength-dependency of the optical characteristics to vary; and a feedback control circuit detector for detecting whether the wavelength-dependent chracteristics of the optical fibre grating match those of a reference optical signal, and, if not, for adjusting the electrical control signal so that the wavelength-dependent characteristics of the optical fibre grating more closely match those of the reference optical signal. --

Signed and Sealed this

Twenty-second Day of October, 2002

*Attest:*

*Attesting Officer*

JAMES E. ROGAN
*Director of the United States Patent and Trademark Office*